2 Sheets—Sheet 1.

G. W. BAKER,

Assignor to THE WHITE SEWING MACHINE COMPANY.

EMBROIDERING ATTACHMENT FOR SEWING MACHINES.

No. 10,463. Reissued Apr. 1, 1884.

WITNESSES

G. T. Nottingham

Geo. P. Downing

INVE

George W. Baker

By H. A. Simmons

Attorney.

N. PETERS, Photo-Lithographer, Washington, D. C.

2 Sheets—Sheet 2.

G. W. BAKER,

Assignor to THE WHITE SEWING MACHINE COMPANY.

EMBROIDERING ATTACHMENT FOR SEWING MACHINES.

No. 10,463. Reissued Apr. 1, 1884.

WITNESSES
S. G. Nottingham
William H. Ruff

INVENTOR
George W. Baker.
By H. A. Seymour
Attorney

N. PETERS, Photo-Lithographer, Washington, D. C.

UNITED STATES PATENT OFFICE.

GEORGE W. BAKER, OF CLEVELAND, OHIO, ASSIGNOR TO THE WHITE SEWING MACHINE COMPANY, OF SAME PLACE.

EMBROIDERING ATTACHMENT FOR SEWING-MACHINES.

SPECIFICATION forming part of Reissued Letters Patent No. 10,463, dated April 1, 1884.

Original No. 274,548, dated March 27, 1883. Application for reissue filed November 26, 1883.

*To all whom it may concern:*

Be it known that I, GEORGE W. BAKER, of Cleveland, in the county of Cuyahoga and State of Ohio, have invented certain new and useful Improvements in Embroidering Attachments for Sewing-Machines; and I do hereby declare the following to be a full, clear, and exact description of the invention, such as will enable others skilled in the art to which it pertains to make and use the same.

My invention relates to embroidering attachments for sewing-machines; and it consists in the parts and combinations of parts, as will be hereinafter fully set forth and claimed.

Figure 1:
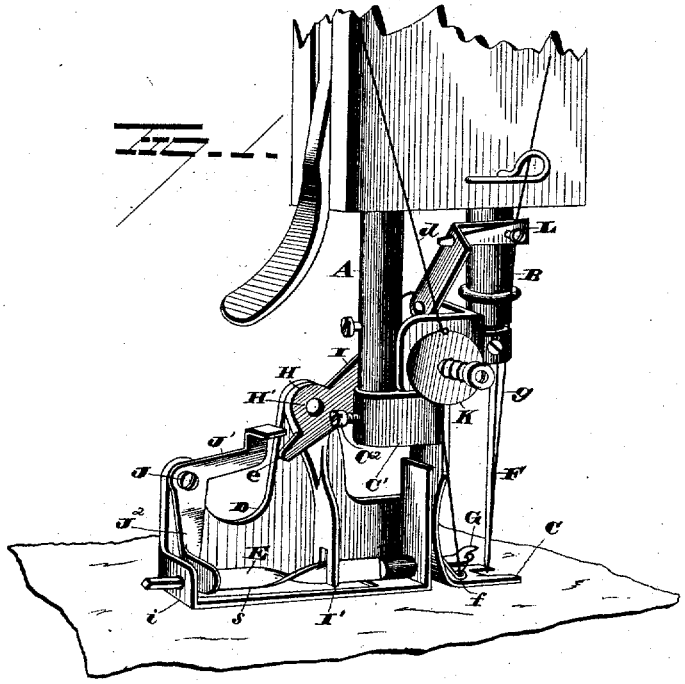
Figure 2:
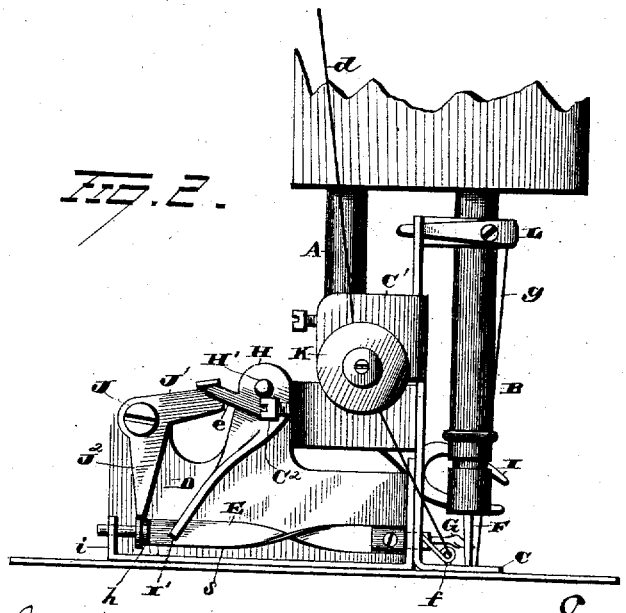
Figure 3:
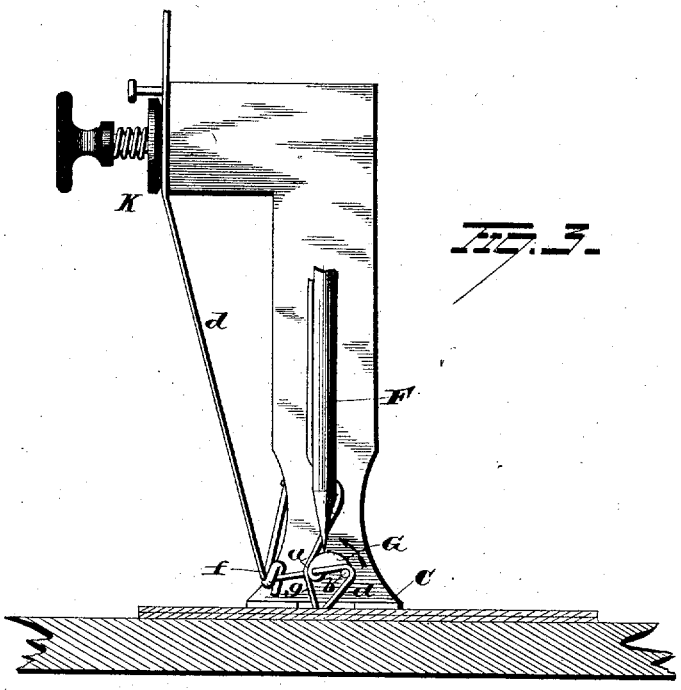
Figure 4:
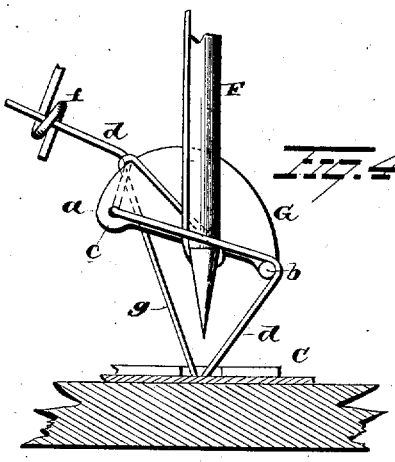
Figure 5:
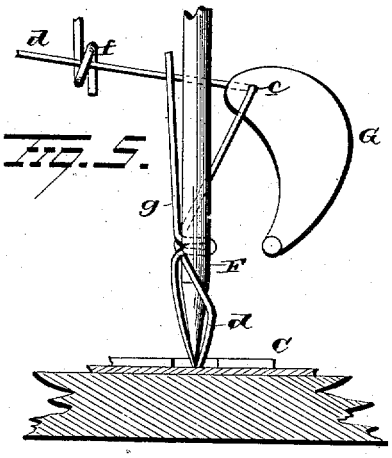

In the drawings, Figure 1 is a view in perspective of my embroidering device, showing it secured in place by being fastened to the presser-foot bar. Fig. 2 is a view in front elevation of the same. Figs. 3, 4, and 5 are views showing the different positions of the looper, threads, and needle.

A represents the presser-foot bar of a sewing-machine, to which I prefer to secure my embroidering attachment.

B represents the needle-bar of a sewing-machine, which is provided at the rear side with the usual set-screw for retaining the needle in its socket.

C is the presser-foot, which is secured to the presser-foot bar A by means of the socket-piece C′ and set-screw $C^2$. To the vertical portion of this presser-foot C, and beneath the socket-piece C′, is secured a frame, D. Journaled in the frame D is a spiral shaft, E. The end of this shaft E, which is nearest the needle F, is provided with a thread-looping device, G, which is formed as shown more clearly in Fig. 3, and provided with two small arms, *a* and *b*. One of the arms, *a*, is provided with an eye, *c*, through which the embroidering-thread passes.

H is a bell-crank, which is pivoted at H′ to the frame D. One arm, I, of the bell-crank H is bifurcated, and thus adapted to engage with a set-screw on the needle-bar B, from which it receives a vertical reciprocating motion, which in turn communicates a horizontal reciprocating motion to the arm I′ of the bell-crank. This arm I′ is also bifurcated or slotted at the end, said end being thus adapted to engage with the shaft E and impart to it a reciprocating rotary motion by its engagement with the spiral portion thereof, and allow the shaft to be retained in a non-rotary position while the bifurcated end of the bell-crank engages the straight portion *s* of the shaft. The spiral shaft is moved endwise in one direction by the frictional engagement of the bifurcated end of the bell-crank with its spiral portion, while it is moved endwise in the opposite direction by means of the bell-crank J, as will be explained.

J is a small bell-crank, which is also pivoted to the frame D in the rear. One arm, J′, of this bell-crank is adapted to engage with a lug or short arm, *e*, which extends out from the bell-crank H. The other arm, $J^2$, is adapted to engage with the shoulder *h* of the shaft E, and acts to move it forward at the required time, as will be hereinafter fully explained.

K is a tension device of any suitable construction, through which the embroidering-thread *d* passes before being passed through the eye *c* of the looper. The embroidering-thread *d* also passes through another eye, *f*, formed in the end of a piece of spring-wire, said eye *f* being set nearly on a horizontal plane with the arms *a* and *b* of the looper G, thus guiding the thread in a horizontal direction to the looper, as shown in Fig. 3. L is another tension device, which is located beneath the take-up of the sewing-machine (not shown) and between said take-up and the needle. The function of this tension L is to keep the needle-thread *g* taut between the said tension L and the eye of the needle.

The operation of my device is as follows: The needle-thread *g* is threaded on the machine in the usual manner, with the exception that it is passed through the tension L before being passed through the eye of the needle F. The embroidering-thread *d* is first passed through the tension K, through the eye *f*, and then through the eye *c*, as shown in Fig. 3. Now, as the needle-bar and needle move upward the looper G is caused, by means of the bell-crank H, to make a partial revolution in the direction of the arrow, as shown in Fig. 3, which in turn causes the arm *b* of the looper G to engage with the embroidering-thread *d* and bring it to the position shown, Fig. 3. The arm *a* of the looper is also caused to pass ahead of the needle-point and between said needle-point and the goods to be stitched or embroidered. At the downward motion of the needle-bar and needle the point of the needle is caused to pass between the looper and the embroidering-thread *d* about midway between the arms *a* and *b*, and from thence down through the goods. This position of the needle, looper, and threads is shown in Fig. 4, and will be clearly understood. Now, as the needle passes downward the bifurcated end of arm I′, engaging the spiral portion of the shaft E, operates to rotate the shaft and also to move it backwardly until the shoulder *h* on the shaft has engaged the lower end of the arm $J^2$ of the bell-crank J and moved it backwardly until it has engaged the bearing *i*, which movement will cause the needle-thread *g* to slip from the arm *a* of the looper G. As the needle is forced still farther downward, the bifurcated end of the arm I′ will traverse the straight portion *s* of the shaft, and at the same time the lug *e* on the bell-crank H will engage the arm J′ of the bell-crank J and raise said arm, thereby causing the arm $J^2$ to engage the shoulder *h* on the shaft E and move the latter forward without imparting a rotary movement thereto, and cause the looper to assume the position shown in Fig. 2. As represented in Fig. 5, the threads are interwoven, which results in the embroidery-thread *d* being sewed to the goods, thus forming an embroidery-stitch.

Having fully described my invention, what I claim as new, and desire to secure by Letters Patent, is—

1. In a sewing-machine embroidering attachment, the combination, with a shaft provided with a looper having an eye for the passage of the embroidery-thread, of means actuated by the needle-bar and adapted to engage the looper-shaft and reciprocate the same and move the looper away from the needle, and also rotate the looper through a half-circle, and then move the looper toward the needle and rotate it back to its original position, substantially as set forth.

2. In a sewing-machine embroidering attachment, a rotary reciprocating spiral shaft arranged horizontally and operated by the needle-bar, and carrying a looper provided with arms adapted to engage the embroidering-thread, one of said arms being provided with an eye, substantially as set forth.

3. In a sewing-machine embroidering attachment, a horizontal spiral shaft provided with a looper having arms adapted to loop the embroidering-thread, said shaft being operated from the needle-bar by bell-cranks to allow the needle of the machine to pass through the loop of said thread, substantially as set forth.

4. In a sewing-machine embroidering attachment, the combination, with a looping device, of a spiral shaft and bifurcated bell-cranks engaging the shaft, substantially as set forth.

5. In a sewing-machine embroidering device, the combination, with a spiral shaft and a bell-crank adapted to impart a reciprocating motion to said shaft, of a second bell-crank adapted to engage with the first and also with the shaft, whereby the said shaft is moved forward in a horizontal direction, substantially as and for the purpose set forth.

GEORGE W. BAKER.

Witnesses:

GEO. F. DOWNING,

S. G. NOTTINGHAM.